(12) United States Patent
Jee et al.

(10) Patent No.: US 10,997,647 B2
(45) Date of Patent: May 4, 2021

(54) COFFEE DRINK ORDER PROCESSING APPARATUS USING UNMANNED COFFEE DRINK MAKING MACHINE, AND OPERATING METHOD THEREFOR

(71) Applicant: DAL.KOMM CO., LTD, Seongnam-si (KR)

(72) Inventors: Sungwon Jee, Hanam-si (KR); Youngseok Kang, Incheon (KR); Sera Park, Seoul (KR)

(73) Assignee: DAL.KOMM CO., LTD, Seongnam-si (KR)

( * ) Notice: Subject to any disclaimer, the term of this patent is extended or adjusted under 35 U.S.C. 154(b) by 75 days.

(21) Appl. No.: 16/613,802

(22) PCT Filed: Jan. 23, 2018

(86) PCT No.: PCT/KR2018/000992
§ 371 (c)(1),
(2) Date: Nov. 15, 2019

(87) PCT Pub. No.: WO2018/221825
PCT Pub. Date: Dec. 6, 2018

(65) Prior Publication Data
US 2020/0082461 A1    Mar. 12, 2020

(30) Foreign Application Priority Data

May 30, 2017   (KR) .......................... 10-2017-0066567

(51) Int. Cl.
*G06Q 30/06*   (2012.01)
*A47J 31/02*   (2006.01)
(Continued)

(52) U.S. Cl.
CPC .......... *G06Q 30/0635* (2013.01); *A47J 31/02* (2013.01); *G06Q 10/02* (2013.01);
(Continued)

(58) Field of Classification Search
CPC .... G06Q 30/0635; G06Q 10/02; A47J 31/007
See application file for complete search history.

(56) References Cited

U.S. PATENT DOCUMENTS

2015/0105880 A1*  4/2015  Slupik ................ H04L 12/2825
                                                                  700/90
2018/0325306 A1* 11/2018  Mathure ............. A47J 31/4403

FOREIGN PATENT DOCUMENTS

KR    10-2013-0082641 A    7/2013
KR    10-2014-0134152 A   11/2014
(Continued)

OTHER PUBLICATIONS

"Ground Coffee Vending Machine 'Mail Bean', used at Coffee shop and Unmanned Self-service Cafe, is Very Good", Internet blog, Apr. 8, 2017., <URL: http://blog.naver.com/allppm/220978254842>, 22pages with English translation. See pp. 1-4, 6-8.
(Continued)

*Primary Examiner* — A. Hunter Wilder
(74) *Attorney, Agent, or Firm* — Park, Kim & Suh, llc

(57) ABSTRACT

Disclosed are a coffee drink order processing apparatus using an unmanned coffee drink making machine and an operating method thereof. The present invention may provide support so that, when an order request message for a coffee drink is received from a client terminal of a user, a making-reservation command for the coffee drink ordered by the user is transmitted to the unmanned coffee drink making machine installed in an unmanned coffee drink selling store in consideration of an expected arrival time of the user at the unmanned coffee drink selling store, and thus the user may immediately pick up the coffee drink that the user ordered without a waiting time when the user arrives at the unmanned coffee drink selling store.

11 Claims, 2 Drawing Sheets

(51) Int. Cl.
　　　*G06Q 10/02*　　　　(2012.01)
　　　*G07C 3/14*　　　　(2006.01)
　　　*G06Q 50/12*　　　　(2012.01)
(52) U.S. Cl.
　　　CPC .......... *G06Q 30/0621* (2013.01); *G07C 3/14* (2013.01); *G06Q 50/12* (2013.01)

(56) References Cited

FOREIGN PATENT DOCUMENTS

| KR | 10-2016-0068403 A | 6/2016 |
| KR | 10-1651645 B1 | 8/2016 |
| KR | 10-1706621 B1 | 2/2017 |

OTHER PUBLICATIONS

International Search Report in International Application No. PCT/KR2018/000992, dated May 1, 2018, 2pages.

* cited by examiner

COFFEE DRINK ORDER PROCESSING APPARATUS USING UNMANNED COFFEE DRINK MAKING MACHINE, AND OPERATING METHOD THEREFOR

CROSS-REFERENCE TO RELATED APPLICATIONS

This application is the National Stage filing under 35 U.S.C. 371 of International Application No. PCT/KR2018/000992, filed on Jan. 23, 2018, which claims the benefit of Korean Patent Application No. 10-2017-0066567, filed on May 30, 2017, the contents of which are all hereby incorporated by reference herein in their entirety.

TECHNICAL FIELD

The present invention relates to a coffee drink order processing apparatus, which is capable of rapidly providing a user with a coffee drink by using an unmanned coffee drink making machine, and an operating method thereof.

BACKGROUND ART

Recently, as the demand for coffee increases, various coffee shops have emerged, and the trend of placing importance on the quality of coffee becomes clear, and coffee drink making machines for making coffee drinks are also developed and distributed in various forms.

In local coffee shops where many companies are located, many people gather at the coffee shop at the same time at the lunch time, so that there is a problem in that one person has to wait a long time to order a coffee drink.

In relation to this, in recent days, as a part of an effort to reduce the waiting time for ordering coffee drinks, technologies, in which a kiosk for processing orders of coffee drinks is installed in a store, and then when users order coffee drinks through the corresponding kiosk, corresponding order requests are received by a central order processing system in the store and the order receptions are processed, are emerged.

However, in the case of the order processing system using the kiosk, the user must go directly to the store and enter an order in the kiosk installed in the store, and wait for the coffee drink in the store until the coffee drink is completely made after entering the order, so that there is an unnecessary waiting time.

Further, recently, as the robot technology and the artificial intelligence technology are developed, mechanical devices that can similarly mimic human behavior are being developed. As an example of such mechanical devices, unmanned coffee drink making machines which discharge and mix materials according to predetermined ratios and make coffee drinks have emerged.

According to the development of the unmanned coffee drink making machine, in order to maximize the operating profit by minimizing the number of employees, such as management staffs and baristas, an unmanned coffee drink selling store, in which an unmanned coffee drink making machine that makes coffee on behalf of the barista is placed, has emerged.

Accordingly, there is a need for research on an order processing system, which, in order to reduce the waiting time for ordering coffee drinks and the waiting time for the coffee drink to be made and come out, and enable a user to rapidly pick up the coffee drink in an unmanned coffee drink selling store, receives an order request for a coffee drink from a client terminal, such as a smart phone, of a user and makes the coffee drink in time when the user arrives at the store by using unmanned coffee drink making machines to support the user to immediately pick up the coffee drink without incurring a waiting time when the user arrives at the store.

DISCLOSURE

Technical Problem

An object of the present invention is to provide a coffee drink order processing apparatus, which provides support so that, when an order request message for a coffee drink is received from a client terminal of a user, transmits a making-reservation command for the coffee drink ordered by the user to the unmanned coffee drink making machine installed in an unmanned coffee drink selling store in consideration of an expected arrival time of the user at the unmanned coffee drink selling store, and thus the user may immediately pick up the coffee drink that the user ordered without incurring a waiting time when the user arrives at the unmanned coffee drink selling store, and an operating method thereof.

Technical Solution

An exemplary embodiment of the present invention provides an apparatus for processing an order for a coffee drink, which is connected with a plurality of unmanned coffee drink making machines installed in an unmanned coffee drink selling store through a network and performs order processing on a coffee drink, the apparatus including: a movement means table maintaining unit, which stores and maintains a movement means table, in which information on a predetermined different movement speed is recorded while corresponding to each of a plurality of different movement means; a map data storing unit, which stores map data about a region up to a predetermined radius around a location of the unmanned coffee drink selling store; an order request message receiving unit, which receives an order request message for a first coffee drink among the plurality of different kinds of coffee drinks predetermined to be orderable from a client terminal of a user; a location information requesting unit, which requests a transmission of location information on a current location of the client terminal from the client terminal in response to the order request message; a movement means information requesting unit, which when first location information is received from the client terminal and it is checked that the current location of the client terminal according to the first location information is included in the region included in the map data, requests the transmission of information about a movement means to the unmanned coffee drink selling store from the client terminal; a movement speed checking unit, which when the information about a first movement means is received from the client terminal as the information about the movement means to the unmanned coffee drink selling store, checks information on a first movement speed, which is recorded while corresponding to the first movement means, with reference to the movement means table; a movement time calculating unit, which when the information on the first movement speed is checked, checks a movement route in the case where the client terminal moves from the current location of the client terminal to the unmanned coffee drink selling store based on the current location of the client terminal according to the first location information with reference to the map data, and calculates an expected movement time to the unmanned coffee drink selling store of the client terminal based on the first movement speed and the movement route; and a command transmitting unit, which when a reservation time obtained by deducting a first making time predetermined to be consumed for making the first coffee drink from the expected movement time elapses, transmits a making-reservation command directing to start the making of the first coffee drink to a first unmanned coffee drink making machine among the plurality of unmanned coffee drink making machines.

Another exemplary embodiment of the present invention provides a method of operating an apparatus for processing an order for a coffee drink, the apparatus being connected with a plurality of unmanned coffee drink making machines installed in an unmanned coffee drink selling store through a network and performing order processing on a coffee drink, the method including: storing and maintaining a movement means table, in which information on a predetermined different movement speed is recorded while corresponding to each of a plurality of different movement means; maintaining a map data storing unit in which map data about a region up to a predetermined radius around a location of the unmanned coffee drink selling store is stored; receiving an order request message for a first coffee drink among the plurality of different kinds of coffee drinks predetermined to be orderable from a client terminal of a user; requesting a transmission of location information on a current location of the client terminal from the client terminal in response to the order request message; when first location information is received from the client terminal and it is checked that the current location of the client terminal according to the first location information is included in the region included in the map data, requesting the transmission of information about a movement means to the unmanned coffee drink selling store from the client terminal; when the information about a first movement means is received from the client terminal as the information about the movement means to the unmanned coffee drink selling store, checking information on a first movement speed, which is recorded while corresponding to the first movement means, with reference to the movement means table; when the information on the first movement speed is checked, checking a movement route in the case where the client terminal moves from the current location of the client terminal to the unmanned coffee drink selling store based on the current location of the client terminal according to the first location information with reference to the map data, and calculating an expected movement time to the unmanned coffee drink selling store of the client terminal based on the first movement speed and the movement route; and when a reservation time obtained by deducting a first making time predetermined to be consumed for making the first coffee drink from the expected movement time elapses, transmitting a making-reservation command directing to start the making of the first coffee drink to a first unmanned coffee drink making machine among the plurality of unmanned coffee drink making machines.

Advantageous Effects

The present invention may provide a coffee drink order processing apparatus, which provides support so that, when an order request message for a coffee drink is received from a client terminal of a user, transmits a making-reservation command for the coffee drink ordered by the user to the unmanned coffee drink making machine installed in an unmanned coffee drink selling store in consideration of an expected arrival time of the user at the unmanned coffee drink selling store, and thus the user may immediately pick up the coffee drink that the user ordered without incurring a waiting time when the user arrives at the unmanned coffee drink selling store, and an operating method thereof.

MODE FOR CARRYING OUT THE INVENTION

Figure 1:
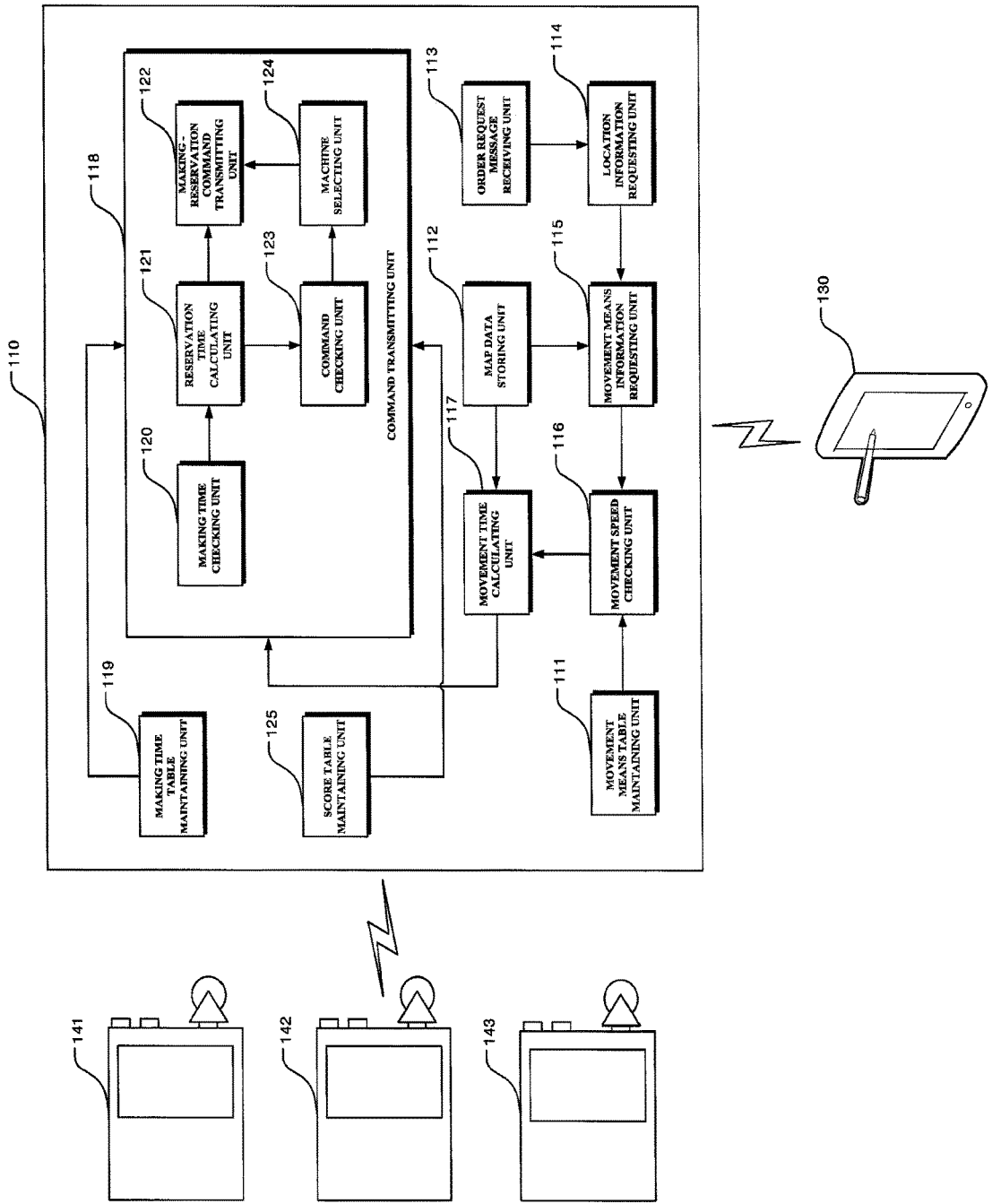
FIG. 1 is a diagram illustrating a structure of a coffee drink order processing apparatus according to an exemplary embodiment of the present invention.

Hereinafter, exemplary embodiments of the present invention will be described in detail with reference to the accompanying drawings. The description is not intended to limit the present invention to the specific exemplary embodiments, and it will be appreciated that the present invention includes all modifications, equivalences, or substitutions included in the spirit and the technical scope of the present invention. In describing each drawing, similar reference numerals are used for similar constituent elements, and all terms used herein including technical or scientific terms have the same meanings as meanings which are generally understood by those skilled in the art unless they are differently defined.

FIG. 1 is a diagram illustrating a structure of a coffee drink order processing apparatus according to an exemplary embodiment of the present invention.

A coffee drink order processing apparatus 110 according to the present invention may be connected with a plurality of unmanned coffee drink making machines 141, 142, and 143 installed in an unmanned coffee drink selling store through a network to perform an order processing on coffee drinks. To this end, the coffee drink order processing apparatus 110 according to the present invention includes a movement means table maintaining unit 111, a map data storing unit 112, an order request message receiving unit 113, a location information requesting unit 114, a movement means information requesting unit 115, a movement speed checking unit 116, a movement time calculating unit 117, and a command transmitting unit 118.

Further, each of the plurality of unmanned coffee drink making machines 141, 142, and 143 may include a material storing unit storing materials for making a coffee drink, a paper cup storing unit for storing a plurality of paper cups, a drink extraction unit for extracting the coffee drink based on the material, a drink discharge port for discharging the extracted coffee drink to the outside, and a paper cup providing unit for controlling a first paper cup among the plurality of paper cups to be discharged from the paper cup storing unit, the first paper cup to move toward the drink discharge port, and the first paper cup to be filled with the coffee drink discharged through the drink discharge port.

First, the movement means table maintaining unit 111 stores and maintains a movement means table, in which information on a predetermined different movement speed is recorded while corresponding to each of the plurality of different movement means.

For example, in the movement means table, information represented in Table 1 below may be recorded.

TABLE 1

| Plurality of different movement means | Information on different movement speed |
|---|---|
| Waking | 4 km/h |
| Car | 30 km/h |
| Bicycle | 15 km/h |
| ... | ... |

The map data storing unit 112 stores map data about a region up to a predetermined radius around the location of the unmanned coffee drink selling store.

For example, map data storing unit 112 may store map data about a region up to a radius of "10 km" around the location of the unmanned coffee drink selling store.

The order request message receiving unit 113 receives an order request message for a first coffee drink among the plurality of different kinds of coffee drinks predetermined to be orderable from a client terminal 130 of a user.

The location information requesting unit 114 requests the transmission of location information on a current location of the client terminal 130 from the client terminal 130 in response to the order request message.

When first location information is received from the client terminal 130, the movement means information requesting unit 115 checks whether the current location of the client terminal 130 according to the first location information exists in the region included in the map data, and when it is checked that the current location of the client terminal 130 is included in the region included in the map data, the movement means information requesting unit 115 requests the transmission of information about a movement means to the unmanned coffee drink selling store from the client terminal 130.

When the information about a first movement means is received from the client terminal 130 as the information about the movement means to the unmanned coffee drink selling store, the movement speed checking unit 116 checks information on a first movement speed, which is recorded while corresponding to the first movement means, with reference to the movement means table.

For example, when information indicating "walking" is received from the client terminal 130 as the information about the first movement means, the movement speed checking unit 116 may check "4 km/h", which is recorded while corresponding to the first movement means of "walking", as the information on the first movement speed with reference to the movement means table like Table 1.

When the information on the first movement speed is checked, the movement time calculating unit 117 checks a movement route in the case where the client terminal 130 moves from the current location of the client terminal 130 to the unmanned coffee drink selling store based on the current location of the client terminal 130 according to the first location information with reference to the map data, and calculates an expected movement time to the unmanned coffee drink selling store of the client terminal 130 based on the first movement speed and the movement route.

For example, when it is checked that the first movement speed is "4 km/h" through the movement speed checking unit 116, and a distance according to the movement route from the current location of the client terminal 130 to the unmanned coffee drink selling store is "1 km", the movement time calculating unit 117 may calculate an expected movement time of the client terminal 130 to the unmanned coffee drink selling store as "15 minutes".

When a reservation time obtained by deducting a first making time predetermined to be consumed for making the first coffee drink from the expected movement time elapses, the command transmitting unit 118 transmits a making-reservation command directing to start the making of the first coffee drink to a first unmanned coffee drink making machine among the plurality of unmanned coffee drink making machines 141, 142, and 143.

When the making-reservation command is received in the first unmanned coffee drink making machine, the first unmanned coffee drink making machine may make the first coffee drink and put the first coffee drink in a paper cup after the reservation time in response to the making-reservation command, and in this case, when the user of the client terminal 130 arrives at the unmanned coffee drink selling store, the user may immediately pick up the first coffee drink made according to the arrival time from the first unmanned coffee drink making machine, so that the user can immediately receive the first coffee drink without having to wait for a separate order or for making the coffee drink.

In this case, according to the exemplary embodiment of the present invention, the coffee drink order processing apparatus 110 may further include a making time table maintaining unit 119.

The making time table maintaining unit 119 stores and maintains a making time table in which information on a predetermined making time for a different coffee drink is recorded while corresponding to each of the plurality of different kinds of coffee drinks predetermined to be orderable.

For example, in the making time table, information represented in Table 2 below may be recorded.

TABLE 2

| Plurality of different kinds of coffee drinks | Information on making time of different coffee drinks |
|---|---|
| Americano | Three minutes |
| Moca coffee | Five minutes |
| Latte | Six minutes |
| ... | ... |

In this case, according to the exemplary embodiment of the present invention, the command transmitting unit 118 may include a making time checking unit 120, a reservation time calculating unit 121, and a making-reservation command transmitting unit 122.

The making time checking unit 120 checks the information on the first making time recorded while corresponding to the first coffee drink with reference to the making time table.

For example, when the first coffee drink is "Americano", the making time checking unit 120 may check the making time of "three minutes" that is recorded while corresponding to "Americano" as the information on the first making time with reference to the making time table like Table 2.

The reservation time calculating unit 121 calculates the reservation time obtained by deducting the first making time from the expected movement time.

In relation to this, when the expected movement time calculated in the movement time calculating unit 117 is "15 minutes" and it is checked that the first making time is "three minutes", the reservation time calculating unit 121 may calculate "12 minutes" that is obtained by deducting the first making time of "three minutes" from the expected movement time of "15 minutes" as the reservation time.

When the reservation time for the first unmanned coffee drink making machine elapses, the making-reservation command transmitting unit 122 transmits the making-reservation command directing to start the making of the first coffee drink.

That is, as described in the foregoing example, when the reservation time is calculated as "12 minutes", the making-reservation command transmitting unit 122 may transmit a making-reservation command directing to start the making of "Americano" that is the first coffee drink to the first unmanned coffee drink making machine when "12 minutes" elapse, and in this case, the first unmanned coffee drink making machine starts to make "Americano" after "12 minutes" elapse in response to the making-reservation command to support the user to immediately pick up "Americano" without incurring a waiting time when the user arrives at the unmanned coffee drink selling store after "15 minutes".

In this case, according to the exemplary embodiment of the present invention, the command transmitting unit 118 may further include a command checking unit 123 and a machine selecting unit 124.

When the reservation time calculating unit 121 completes the calculation of the reservation time, the command checking unit 123 checks other making-reservation commands directing to make coffee drinks pre-allocated to each of the plurality of unmanned coffee drink making machines 141, 142, and 143.

Further, the machine selecting unit 124 selects an unmanned coffee drink making machine, to which a making-reservation command according to the same reservation time as the reservation time is not allocated, among the plurality of unmanned coffee drink making machines 141, 142, and 143 as the first unmanned coffee drink making machine to be used for making the first coffee drink based on the result of the checking of other making-reservation commands directing to make the coffee drinks pre-allocated to each of the plurality of unmanned coffee drink making machines 141, 142, and 143.

That is, when the reservation time calculating unit 121 completes the calculation of the reservation time, since the making-reservation command directing to make the first coffee drink cannot be allocated to the unmanned coffee drink making machine to which the making-reservation command of the coffee drink according to the same reservation time as the reservation time is already allocated, the coffee drink order processing apparatus 110 according to the present invention checks other making-reservation commands directing to make coffee drinks, which are already allocated to each of the plurality of unmanned coffee drink making machines 141, 142, and 143 through the command checking unit 123, and then, selects an unmanned coffee drink making machine, to which the same reservation time as the reservation time is not allocated, among the plurality of unmanned coffee drink making machines 141, 142, and 143 as the first unmanned coffee drink making machine based on the result of the check for other making-reservation commands through the machine selecting unit 124 to process a reservation order not to overlap.

In this case, according to the exemplary embodiment of the present invention, the coffee drink order processing apparatus 110 may further include a score table maintaining unit 125 which stores and maintains an evaluation score table in which quality evaluation scores calculated based on the evaluations of each of the plurality of unmanned coffee drink making machines 141, 142, and 143 by the plurality of users are recorded.

For example, in the evaluation score table, information represented in Table 3 below may be recorded.

TABLE 3

| Plurality of unmanned coffee drink making machines | Quality evaluation score |
| --- | --- |
| Unmanned coffee drink making machine 1 | 80 |
| Unmanned coffee drink making machine 2 | 90 |
| Unmanned coffee drink making machine 3 | 70 |
| . . . | . . . |

In relation to this, the evaluation score table like Table 3 may be established by performing a survey and the like for a making quality of a coffee drink of each machine on the plurality of users who has drunk coffee drinks made through the plurality of unmanned coffee drink making machines 141, 142, and 143 and calculating a quality evaluation score for each machine.

In this case, when it is checked that there are two more unmanned coffee drink making machines, to which the making-reservation command according to the same reservation time as the reservation time is not allocated, among the plurality of unmanned coffee drink making machines 141, 142, and 143, the machine selecting unit 124 may select an unmanned coffee drink making machine having the highest quality evaluation score among the two or more checked unmanned coffee drink making machines as the first unmanned coffee drink making machine to be used for making the first coffee drink.

That is, when there are two more unmanned coffee drink making machines, to which the making-reservation command according to the same reservation time as the reservation time calculated through the reservation time calculating unit 121 is not allocated, among the plurality of unmanned coffee drink making machines 141, 142, and 143, the machine selecting unit 124 may select an unmanned coffee drink making machine having the highest quality evaluation score among the two or more unmanned coffee drink making machines as the first unmanned coffee drink making machine with reference to the evaluation score table like Table 3.

Further, according to the exemplary embodiment of the present invention, when the reservation time calculated by the reservation time calculating unit 121 is a negative value, the machine selecting unit 124 may receive state information related to a current operation state of each of the plurality of unmanned coffee drink making machines 141, 142, and 143 from the plurality of unmanned coffee drink making machines 141, 142, and 143 and select an unmanned coffee drink making machine, of which the current operation state is an idle state in which the making of the coffee drink is not being performed, among the plurality of unmanned coffee drink making machines 141, 142, and 143 as the first unmanned coffee drink making machine to be used for making the first coffee drink.

In this case, the making-reservation command transmitting unit 122 may transmit an immediate-making command directing to immediately start the making of the first coffee drink to the first unmanned coffee drink making machine in response to the case where the reservation time is calculated as the negative value.

That is, the reservation time calculated by the reservation time calculating unit 121 is the negative value, the user already arrives at the unmanned coffee drink selling store or is likely to arrive before the making of the coffee drink is completed, so that the machine selecting unit 124 may select an unmanned coffee drink making machine in the idle state in which the unmanned coffee drink making machine is not currently making the coffee drink among the plurality of unmanned coffee drink making machines 141, 142, and 143 as the first unmanned coffee drink making machine and the making-reservation command transmitting unit 122 may transmit the immediate-making command directing to immediately make the first coffee drink to the first unmanned coffee drink making machine.

Figure 2:
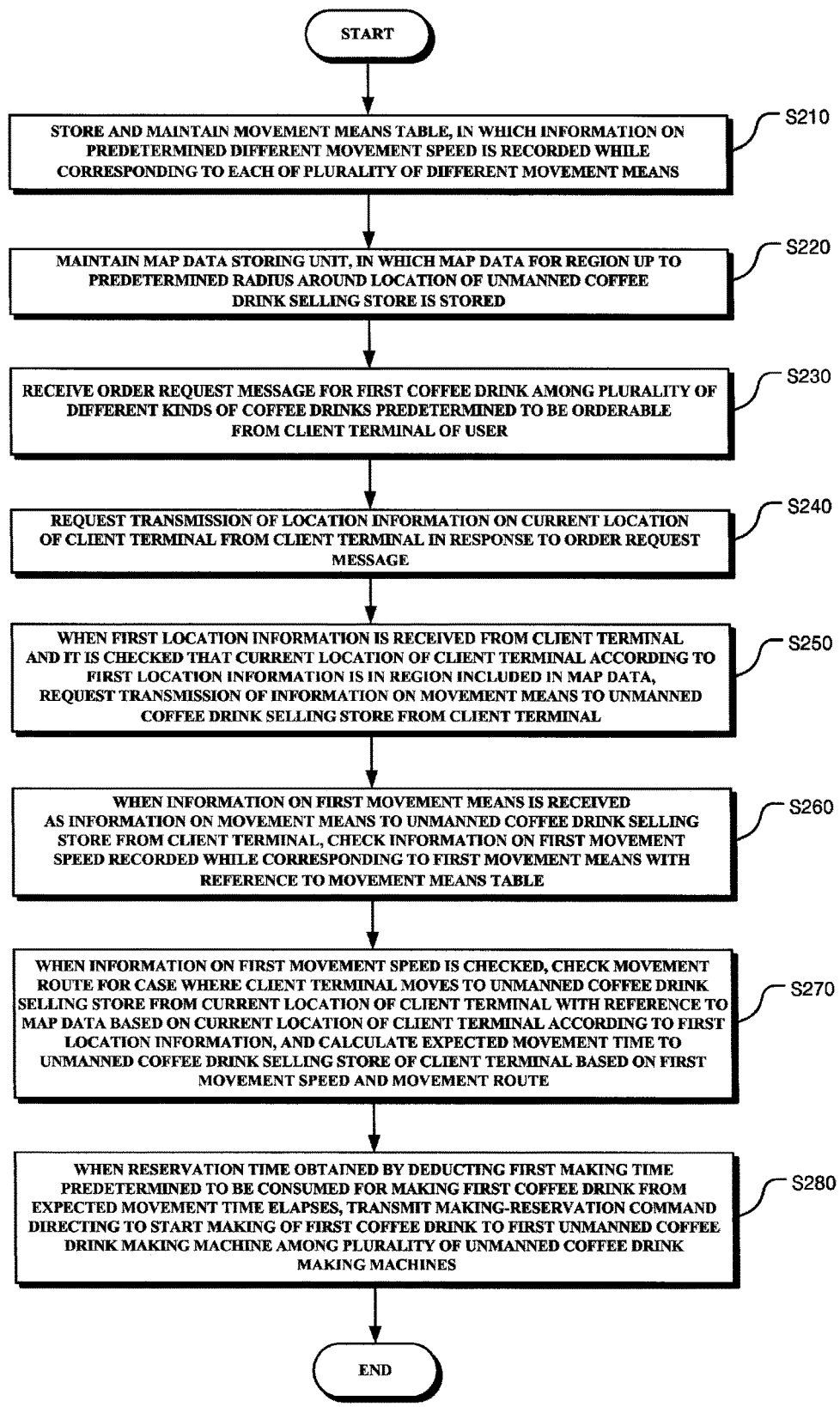
FIG. 2 is a flowchart illustrating an operating method of the coffee drink order processing apparatus according to an exemplary embodiment of the present invention.

FIG. 2 is a flowchart illustrating an operating method of the coffee drink order processing apparatus which is connected with the plurality of unmanned coffee drink making machines installed in an unmanned coffee drink selling store through a network and performs processing on an order of a coffee drink according to an exemplary embodiment of the present invention.

In operation S210, the coffee drink order processing apparatus stores and maintains a movement means table, in which information on a predetermined different movement speed is recorded while corresponding to each of a plurality of different movement means.

In operation S220, the coffee drink order processing apparatus maintains a map data storing unit, in which map data for a region up to a predetermined radius around a location of the unmanned coffee drink selling store is stored.

In operation S230, the coffee drink order processing apparatus receives an order request message for a first coffee drink among a plurality of different kinds of coffee drinks predetermined to be orderable from a client terminal of a user.

In operation S240, the coffee drink order processing apparatus requests the transmission of location information on a current location of the client terminal from the client terminal in response to the order request message.

In operation S250, when first location information is received from the client terminal and it is checked that the current location of the client terminal according to the first location information is in a region included in the map data, the coffee drink order processing apparatus requests the transmission of information on a movement means to the unmanned coffee drink selling store from the client terminal.

In operation S260, when information on a first movement means is received as the information on the movement means to the unmanned coffee drink selling store from the client terminal, the coffee drink order processing apparatus checks information on a first movement speed recorded while corresponding to the first movement means with reference to the movement means table.

In operation S270, when the information on the first movement speed is checked, the coffee drink order processing apparatus checks a movement route for the case where the client terminal moves to the unmanned coffee drink selling store from the current location of the client terminal with reference to the map data based on the current location of the client terminal according to the first location information, and calculates an expected movement time to the unmanned coffee drink selling store of the client terminal based on the first movement speed and the movement route.

In operation S280, when a reservation time obtained by deducting a first making time predetermined to be consumed for making the first coffee drink from the expected movement time elapses, the coffee drink order processing apparatus transmits a making-reservation command directing to start the making of the first coffee drink to a first unmanned coffee drink making machine among the plurality of unmanned coffee drink making machines.

In this case, according to the exemplary embodiment of the present invention, the operating method of the coffee drink order processing apparatus may further include storing and maintaining a making time table in which information on a predetermined making time for a different coffee drink is recorded while corresponding to each of the plurality of different kinds of coffee drinks predetermined to be orderable.

In this case, operation S280 may include checking the information on the first making time recorded while corresponding to the first coffee drink with reference to the making time table, calculating the reservation time obtained by deducting the first making time from the expected movement time, and when the reservation time for the first unmanned coffee drink making machine elapses, transmitting the making-reservation command directing to start the making of the first coffee drink.

Further, according to the exemplary embodiment of the present invention, operation S280 may further include, when the calculation of the reservation time is completed, checking other making-reservation commands directing to make coffee drinks pre-allocated to each of the plurality of unmanned coffee drink making machines, and selecting an unmanned coffee drink making machine, to which a making-reservation command according to the same reservation time as the reservation time is not allocated, among the plurality of unmanned coffee drink making machines as the first unmanned coffee drink making machine to be used for making the first coffee drink based on the result of the checking of other making-reservation commands directing to make the coffee drinks pre-allocated to each of the plurality of unmanned coffee drink making machines.

In this case, according to the exemplary embodiment of the present invention, the operating method of the coffee drink order processing apparatus may further include storing and maintaining an evaluation score table in which quality evaluation scores calculated based on the evaluations of each of the plurality of unmanned coffee drink making machines by the plurality of users are recorded.

In this case, in the selecting of the unmanned coffee drink making machine as the first unmanned coffee drink making machine, when it is checked that there are two more unmanned coffee drink making machines, to which the making-reservation command according to the same reservation time as the reservation time is not allocated, among the plurality of unmanned coffee drink making machines, the coffee drink order processing apparatus may select an unmanned coffee drink making machine having the highest quality evaluation score among the two or more checked unmanned coffee drink making machines as the first unmanned coffee drink making machine to be used for making the first coffee drink with reference to the evaluation score table.

Further, according to the exemplary embodiment of the present invention, operation S280 may further include, when the reservation time is calculated to be a negative value, receiving state information related to a current operation state of each of the plurality of unmanned coffee drink making machines from the plurality of unmanned coffee drink making machines and selecting an unmanned coffee drink making machine, of which the current operation state is an idle state in which the making of the coffee drink is not being performed, among the plurality of unmanned coffee drink making machines as the first unmanned coffee drink making machine to be used for making the first coffee drink, and transmitting an immediate-making command directing to immediately start the making of the first coffee drink to the first unmanned coffee drink making machine in response to the case where the reservation time is calculated as the negative value.

In the above, the operating method of the coffee drink order processing apparatus according to the exemplary embodiment of the present invention has been described with reference to FIG. 2. Herein, the operating method of the coffee drink order processing apparatus according to the exemplary embodiment of the present invention may correspond to the configurations for the operation of the coffee drink order processing apparatus 110 described with reference to FIG. 1, so that detailed descriptions thereof will be omitted.

The operating method of the coffee drink order processing apparatus according to the exemplary embodiment of the present invention may be implemented by a computer program stored in a storage medium for executing the computer program through a combination with a computer.

Further, the operating method of the coffee drink order processing apparatus according to the exemplary embodiment of the present invention may be implemented in the form of a program command executable through various computer means and be recorded in a computer readable medium. The computer readable medium may include solely or a combination of a program command, a data file, a data structure, and the like. The program command recorded in the medium may be specially designed and configured for the present invention or may be published to those skilled in the computer software and usable. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The invention claimed is:

1. An apparatus for processing an order for a coffee drink, which is connected with a plurality of unmanned coffee drink making machines installed in an unmanned coffee drink selling store through a network and performs order processing on a coffee drink, the apparatus comprising a processor configured to:

store and maintain a movement means table, in which information on a predetermined different movement speed is recorded while corresponding to each of a plurality of different movement means;

store map data about a region up to a predetermined radius around a location of the unmanned coffee drink selling store;

receive an order request message for a first coffee drink among the plurality of different kinds of coffee drinks predetermined to be orderable from a client terminal of a user;

request a transmission of location information on a current location of the client terminal from the client terminal in response to the order request message;

request the transmission of information about a movement means to the unmanned coffee drink selling store from the client terminal when first location information is received from the client terminal and it is checked that the current location of the client terminal according to the first location information is included in the region included in the map data;

check information on a first movement speed, which is recorded while corresponding to the first movement means, with reference to the movement means table, when the information about a first movement means is received from the client terminal as the information about the movement means to the unmanned coffee drink selling store;

check a movement route in the case where the client terminal moves from the current location of the client terminal to the unmanned coffee drink selling store based on the current location of the client terminal according to the first location information with reference to the map data when the information on the first movement speed is checked, and calculate an expected movement time to the unmanned coffee drink selling store of the client terminal based on the first movement speed and the movement route when the information on the first movement speed is checked; and transmit a making-reservation command directing to start the making of the first coffee drink to a first unmanned coffee drink making machine among the plurality of unmanned coffee drink making machines when a reservation time obtained by deducting a first making time predetermined to be consumed for making the first coffee drink from the expected movement time elapses.

2. The apparatus of claim 1, wherein the processor is further configured to:

store and maintain a making time table in which information on a predetermined making time for a different coffee drink is recorded while corresponding to each of the plurality of different kinds of coffee drinks predetermined to be orderable, check information on the first making time recorded while corresponding to the first coffee drink with reference to the making time table;

calculate the reservation time obtained by deducting the first making time from the expected movement time; and transmit the making-reservation command directing to start the making of the first coffee drink to the first unmanned coffee drink making machine when the reservation time elapses.

3. The apparatus of claim 2, wherein the processor is further configured to:

check other making-reservation commands directing to make coffee drinks pre-allocated to each of the plurality of unmanned coffee drink making machines when the calculation of the reservation time is completed; and select an unmanned coffee drink making machine, to which a making-reservation command according to the same reservation time as the reservation time is not allocated, among the plurality of unmanned coffee drink making machines as the first unmanned coffee drink making machine to be used for making the first coffee drink based on the result of the checking of other making-reservation commands directing to make the coffee drinks pre-allocated to each of the plurality of unmanned coffee drink making machines.

4. The apparatus of claim 3, wherein the processor is further configured to:
store and maintain an evaluation score table in which quality evaluation scores calculated based on evaluations of each of the plurality of unmanned coffee drink making machines by the plurality of users are recorded,
wherein the processor selects an unmanned coffee drink making machine having the highest quality evaluation score among the two or more checked unmanned coffee drink making machines as the first unmanned coffee drink making machine to be used for making the first coffee drink with reference to the evaluation score table when it is checked that there are two more unmanned coffee drink making machines, to which the making-reservation command according to the same reservation time as the reservation time is not allocated, among the plurality of unmanned coffee drink making machines.

5. The apparatus of claim 4, wherein the processor is further configured to:
receive state information related to a current operation state of each of the plurality of unmanned coffee drink making machines from the plurality of unmanned coffee drink making machines and selects an unmanned coffee drink making machine, of which the current operation state is an idle state in which the making of the coffee drink is not being performed, among the plurality of unmanned coffee drink making machines as the first unmanned coffee drink making machine to be used for making the first coffee drink when the reservation time is calculated as a negative value, and
transmit an immediate-making command directing to immediately start the making of the first coffee drink to the first unmanned coffee drink making machine in response to the case where the reservation time is calculated as the negative value when the reservation time is calculated as a negative value.

6. A method of operating an apparatus for processing an order for a coffee drink, the apparatus being connected with a plurality of unmanned coffee drink making machines installed in an unmanned coffee drink selling store through a network and performing order processing on a coffee drink, the method comprising:
storing and maintaining a movement means table, in which information on a predetermined different movement speed is recorded while corresponding to each of a plurality of different movement means;
maintaining a map data storing unit in which map data about a region up to a predetermined radius around a location of the unmanned coffee drink selling store is stored;
receiving an order request message for a first coffee drink among the plurality of different kinds of coffee drinks predetermined to be orderable from a client terminal of a user;
requesting a transmission of location information on a current location of the client terminal from the client terminal in response to the order request message;
receiving from the client terminal first location information and checking that the current location of the client terminal according to the first location information is included in the region included in the map data;
requesting the transmission of information about a movement means to the unmanned coffee drink selling store from the client terminal;
receiving from the client terminal the information about a first movement means as the information about the movement means to the unmanned coffee drink selling store,
checking information on a first movement speed, which is recorded while corresponding to the first movement means, with reference to the movement means table;
checking the information on the first movement speed and a movement route;
determining the client terminal moved from the current location of the client terminal to the unmanned coffee drink selling store based on the current location of the client terminal according to the first location information with reference to the map data, and calculating an expected movement time to the unmanned coffee drink selling store of the client terminal based on the first movement speed and the movement route;
determining a reservation time obtained by deducting a first making time predetermined to be consumed for making the first coffee drink from the expected movement time has elapsed; and
transmitting a making-reservation command directing to start the making of the first coffee drink to a first unmanned coffee drink making machine among the plurality of unmanned coffee drink making machines.

7. The method of claim 6, further comprising:
storing and maintaining a making time table in which information on a predetermined making time for a different coffee drink is recorded while corresponding to each of the plurality of different kinds of coffee drinks predetermined to be orderable, wherein the transmitting of the making-reservation command includes:
checking information on the first making time recorded while corresponding to the first coffee drink with reference to the making time table;
calculating the reservation time obtained by deducting the first making time from the expected movement time; and
when the reservation time elapses, transmitting the making-reservation command directing to start the making of the first coffee drink to the first unmanned coffee drink making machine.

8. The method of claim 7, wherein the transmitting of the making-reservation command further includes:
when the calculation of the reservation time is completed, checking other making-reservation commands directing to make coffee drinks pre-allocated to each of the plurality of unmanned coffee drink making machines; and
selecting an unmanned coffee drink making machine, to which a making-reservation command according to the same reservation time as the reservation time is not allocated, among the plurality of unmanned coffee drink making machines as the first unmanned coffee drink making machine to be used for making the first coffee drink based on the result of the checking of other making-reservation commands directing to make the coffee drinks pre-allocated to each of the plurality of unmanned coffee drink making machines.

9. The method of claim 8, further comprising:
storing and maintaining an evaluation score table in which quality evaluation scores calculated based on evaluations of each of the plurality of unmanned coffee drink making machines by the plurality of users are recorded,
wherein the selecting of the unmanned coffee drink making machine as the first unmanned coffee drink making machine includes, when it is checked that there are two more unmanned coffee drink making machines, to which the making-reservation command according to the same reservation time as the reservation time is not allocated, among the plurality of unmanned coffee drink making machines, selecting an unmanned coffee drink making machine having the highest quality evaluation score among the two or more checked unmanned coffee drink making machines as the first unmanned coffee drink making machine to be used for making the first coffee drink with reference to the evaluation score table.

10. The method of claim 9, wherein the transmitting of the making-reservation command further includes: when the reservation time is calculated as a negative value, receiving state information related to a current operation state of each of the plurality of unmanned coffee drink making machines from the plurality of unmanned coffee drink making machines and selecting an unmanned coffee drink making machine, of which the current operation state is an idle state in which the making of the coffee drink is not being performed, among the plurality of unmanned coffee drink making machines as the first unmanned coffee drink making machine to be used for making the first coffee drink, and transmitting an immediate-making command directing to immediately start the making of the first coffee drink to the first unmanned coffee drink making machine in response to the case where the reservation time is calculated as the negative value.

11. A non-transitory computer readable recording medium having a program recorded therein for allowing a computer to execute a method of operating an apparatus for processing an order for a coffee drink, the apparatus being connected with a plurality of unmanned coffee drink making machines installed in an unmanned coffee drink selling store through a network and performing order processing on a coffee drink, the method comprising:
   storing and maintaining a movement means table, in which information on a predetermined different movement speed is recorded while corresponding to each of a plurality of different movement means; maintaining a map data storing unit in which map data about a region up to a predetermined radius around a location of the unmanned coffee drink selling store is stored;
   receiving an order request message for a first coffee drink among the plurality of different kinds of coffee drinks predetermined to be orderable from a client terminal of a user;
   requesting a transmission of location information on a current location of the client terminal from the client terminal in response to the order request message;
   when first location information is received from the client terminal and it is checked that the current location of the client terminal according to the first location information is included in the region included in the map data, requesting the transmission of information about a movement means to the unmanned coffee drink selling store from the client terminal;
   when the information about a first movement means is received from the client terminal as the information about the movement means to the unmanned coffee drink selling store, checking information on a first movement speed, which is recorded while corresponding to the first movement means, with reference to the movement means table;
   when the information on the first movement speed is checked, checking a movement route in the case where the client terminal moves from the current location of the client terminal to the unmanned coffee drink selling store based on the current location of the client terminal according to the first location information with reference to the map data, and calculating an expected movement time to the unmanned coffee drink selling store of the client terminal based on the first movement speed and the movement route; and
   when a reservation time obtained by deducting a first making time predetermined to be consumed for making the first coffee drink from the expected movement time elapses, transmitting a making-reservation command directing to start the making of the first coffee drink to a first unmanned coffee drink making machine among the plurality of unmanned coffee drink making machines.

* * * * *